US012688791B2

(12) United States Patent
Chen et al.

(10) Patent No.: US 12,688,791 B2
(45) Date of Patent: Jul. 21, 2026

(54) INTERACTIVE EDUCATIONAL ELECTRONIC TOY SYSTEM

(71) Applicant: Flycatcher Corp LTD, London (GB)

(72) Inventors: Shay Chen, Hod Hasharon (IL);
Shachar Limor, Givat Shapira (IL)

(73) Assignee: Flycatcher Corp LTD, London (GB)

( * ) Notice: Subject to any disclaimer, the term of this patent is extended or adjusted under 35 U.S.C. 154(b) by 1155 days.

(21) Appl. No.: 17/685,461

(22) Filed: Mar. 3, 2022

(65) Prior Publication Data

US 2022/0215773 A1     Jul. 7, 2022

Related U.S. Application Data

(63) Continuation-in-part of application No. 16/310,861, filed on Dec. 18, 2018, now abandoned, which is a continuation of application No. PCT/IB2017/053645, filed on Jun. 20, 2017.

(60) Provisional application No. 62/352,061, filed on Jun. 20, 2016.

(51) Int. Cl.
| | |
|---|---|
| *G09B 19/00* | (2006.01) |
| *G09B 5/02* | (2006.01) |
| *G09B 5/04* | (2006.01) |
| *G09B 11/00* | (2006.01) |

(52) U.S. Cl.
CPC ............. *G09B 19/003* (2013.01); *G09B 5/02* (2013.01); *G09B 5/04* (2013.01); *G09B 11/00* (2013.01)

(58) Field of Classification Search
CPC . G09B 5/067; G09B 5/04; G09B 5/06; G09B 19/003; G09B 5/02; G09B 11/00; G09B 11/02; G09B 11/04; G09B 11/06; G09B 11/08; G09B 11/10
See application file for complete search history.

(56) References Cited

U.S. PATENT DOCUMENTS

| | | | | |
|---|---|---|---|---|
| 6,572,378 B1 * | 6/2003 | Rehkemper | ............ | G09B 11/04 |
| | | | | 345/173 |
| 9,740,379 B2 * | 8/2017 | Chen | .................... | G06F 3/04845 |
| 2014/0030679 A1 * | 1/2014 | Wong | ..................... | G09B 11/00 |
| | | | | 434/88 |
| 2015/0279226 A1 * | 10/2015 | Harrison | .................. | G09B 7/04 |
| | | | | 434/353 |
| 2019/0337389 A1 * | 11/2019 | Barvesten | .............. | B60K 35/22 |

* cited by examiner

*Primary Examiner* — Peter S Vasat
(74) *Attorney, Agent, or Firm* — Michael J. Feigin, Esq.; Feigin and Fridman LLC

(57) ABSTRACT

A method of providing a challenge to a user, the method including receiving a selection of a selected challenge to be presented to the user, the challenge being selected from a challenge repository, and providing the selected challenge to a projecting device. The selected challenge is processed to form a projectable challenge, which is projected onto a projection surface using the projecting device. A user interacts with the projected challenge to complete the challenge, and at least one user response to the challenge is captured by a response capturing device. The captured response is analyzed to determine whether it is a correct response to the challenge, and based on the analysis, feedback is provided to the user regarding the response or regarding a manner of responding to the challenge.

18 Claims, 11 Drawing Sheets

INTERACTIVE EDUCATIONAL ELECTRONIC TOY SYSTEM

FIELD AND BACKGROUND OF THE INVENTION

The invention, in some embodiments, relates to the field of electronic educational toys, and more specifically to an interactive educational electronic toy system providing a challenge to the user, where the user may be a child or an adult.

SUMMARY OF THE INVENTION

According to some teachings of the present invention there is provided a method of providing a challenge to a user, the method including:

receiving a selection of a selected challenge to be presented to the user, the selected challenge being selected from a challenge repository;

providing the selected challenge to a projecting device;

processing the selected challenge, in accordance with characteristics of at least one of the projecting device, a projection surface, and ambient conditions, to form a projectable challenge;

using the projecting device, projecting the projectable challenge onto a projection surface; and enabling a user to interact with the projectable challenge projected onto the projection surface, thereby to complete the challenge.

In some embodiments, the method further includes providing a user interface to the user for selecting the selected challenge, and receiving the selection includes receiving the selection as an input from the user interface.

In some embodiments, the challenge repository includes a data storage element functionally associated with the projecting device, and wherein the user interface enables the user to select the challenge from the data storage element.

In some embodiments, the method further includes forming a communication link between the projecting device and an additional computing device, wherein the providing a user interface includes providing the user interface on a display of the additional computing device.

In some embodiments, receiving a selection includes at the additional computing device, receiving a selection of an image stored in an image repository of the additional computing device, processing the image to form a processed image useable as the selected challenge, and receiving, as the selected challenge, the processed image.

In some embodiments, receiving a selection of the image includes capturing the image using an image capturing element of the additional computing device. In some embodiments, processing the image includes applying at least one filter to the image.

In some embodiments, providing the user interface includes providing at least one physical button mounted on the projecting device.

In some embodiments, the challenge repository is remote from the projecting device, and wherein the receiving a selection includes receiving a selected challenge, via a remote communication link, from the remote challenge repository. In some embodiments, receiving the selection includes receiving the selection from a remote guide.

In some embodiments, the challenge includes a plurality of challenge steps, and providing the user interface includes enabling the user to move between the plurality of challenge steps. In some such embodiments, projecting the projectable challenge and enabling the user to interact include:

(a) projecting one of the plurality of challenge steps onto the projection surface;

(b) enabling the user to interact with the one of the plurality of challenge steps projected onto the projection surface to complete the one of the plurality of challenge steps; and (c) responsive to input received from the user via the user interface, projecting another of the plurality of challenge steps onto the projection surface.

In some embodiments, the another of the plurality of challenge steps includes a subsequent challenge step to the one of the plurality of challenge steps.

In some embodiments, the another of the plurality of challenge steps includes a previous challenge step to the one of the plurality of challenge steps.

In some embodiments, the another of the plurality of challenge steps includes the one of the plurality of challenge steps, thus enabling the user to repeat the one of the plurality of challenge steps.

In some embodiments, the method further includes, following user interaction with the projectable challenge, capturing at least one user response to the challenge. In some embodiments, capturing at least one user response includes capturing at least one image of the projection surface. In some embodiments, the method further includes transmitting the at least one image to a location remote from the projecting device, via a network.

In some embodiments, the method further includes analyzing the at least one user response to determine whether a response to the challenge, provided by the user during the user interaction, is correct.

In some embodiments, capturing at least one image includes capturing at least one image of the projection surface and of a vicinity thereof, and wherein the analyzing the at least one image includes analyzing the at least one image to determine whether the response to the challenge was provided in a correct manner.

In some embodiments, the method further includes, based on the analyzing, providing feedback regarding the response to the challenge or regarding a manner of responding to the challenge. In some embodiments, providing the feedback includes projecting the feedback onto the projection surface using the projecting device. In some embodiments, projecting the feedback includes projecting a feedback image. In some embodiments, projecting the feedback includes projecting a feedback video. In some embodiments, providing the feedback includes providing audible feedback to the user.

In some embodiments, providing the feedback includes transmitting the feedback to a remote device, via a network.

In some embodiments, processing includes at least one of:

changing a format of an image or a video of the selected challenge;

scaling the image or the video of the selected challenge to a size suitable for the projecting by the projecting device;

scaling the image or the video of the selected challenge to a size suitable for projection onto the projection surface;

dividing the video of the selected challenge into a plurality of frames;

applying at least one filter to the image;

compensating for at least one of optical, geometric, and chromatic distortions arising from physical limitations of the projecting device; and compensating for at least one of optical, geometric, and chromatic distortions arising from physical limitations of the projection surface.

In some embodiments, the selected challenge further includes an audio component, wherein the projecting further includes providing the audio component to the user.

In some embodiments, the response further includes an audio component, and wherein the capturing the at least one user response further includes capturing audio provided by the user as the at least one user response.

According to additional teachings of the present invention there is further provided a system for providing a challenge to a user, the system being associated with at least one challenge repository and a projection surface, the system including:

at least one projecting device adapted to project a challenge onto the projection surface; and a controller including:

a processor functionally associated with the challenge repository and with the at least one projecting device; and a non-transitory computer readable storage medium storing software modules including instructions to be executed by the processor, the non-transitory computer readable storage medium having stored:

instructions to receive a selection of a selected challenge to be projected by the projecting device; and a challenge preparation module including instructions to process the selected challenge in accordance with characteristics of at least one of the projecting device, a projection surface, and ambient conditions, to form a projectable challenge for projection by the at least one projecting device and to provide the projectable challenge to the projecting device for projecting thereof; and a housing accommodating the at least one projecting device and the controller.

In some embodiments, the system further includes a transceiver for enabling communication between the controller and a network. In some embodiments, the at least one challenge repository includes a remote challenge repository remote from the system, and in communication with the controller via the transceiver.

In some embodiments, the at least one challenge repository includes an integral challenge repository forming part of the system and is accommodated within the housing. In some embodiments, the housing includes a port adapted for receipt of a computer memory including a removable challenge repository, and the at least one challenge repository includes the removable challenge repository associated with the system by insertion of the computer memory into the port.

In some embodiments, the system further includes a user interface, wherein the a non-transitory computer readable storage medium further has stored a user interface (UI) input analysis module including instructions for interpreting input provided via the user interface, and wherein the instructions to receive a selection include instructions to receive the selection of the selected challenge from the user interface, the selection being provided to the user interface by a user interacting with the user interface.

In some embodiments, the system further includes an additional computing device in communication with the controller via the transceiver, wherein the user interface includes a user interface provided on a display of the additional computing device.

In some embodiments, the user interface includes at least one physical button disposed on an exterior the housing.

In some embodiments, the challenge includes a plurality of challenge steps, the user interface includes at least one button enabling the user to move from one of the plurality of challenge steps to another of the plurality of challenge steps, and the UI input analysis module further includes instructions, to be carried out in response to receipt of input from the at least one button enabling the user to move between the plurality of challenge steps, to cause the projecting device to project the another of the plurality of challenge steps.

In some embodiments, the at least one button includes a "next step" button, and wherein when using the "next step" button the another of the plurality of challenge steps includes a subsequent challenge step to the one of the plurality of challenge steps. In some embodiments, the at least one button includes a "previous step" button, and wherein when using the "previous step" button the another of the plurality of challenge steps includes a previous challenge step to the one of the plurality of challenge steps. In some embodiments, the at least one button includes a "repeat step" button, and wherein when using the "repeat step" button the another of the plurality of challenge steps includes the one of the plurality of challenge steps.

In some embodiments, the system further includes a response capturing device adapted to capture at least one user response to the challenge.

In some embodiments, the non-transitory computer readable storage medium further has stored a response analysis module including instructions to analyze the at least one user response to the challenge captured by the response capturing device to determine whether the at least one user response was correct.

In some embodiments, the response capturing device includes an image capturing device adapted to capture at least one image of the projection surface including the at least one user response provided on the projection surface.

In some embodiments, the response capturing device includes an image capturing device adapted to capture at least one image of the projection surface and of a vicinity thereof, and wherein the instructions to analyze include instructions to analyze the at least one image to determine whether the response to the challenge was provided in a correct manner.

In some embodiments, the response capturing device includes an audio capturing device adapted to capture an audio response of the user to the challenge.

In some embodiments, the non-transitory computer readable storage medium further has stored a feedback module including instructions to provide feedback regarding the response to the challenge or regarding a manner of responding to the challenge based on an analysis conducted by execution of the instructions to analyze included in the response analysis module.

In some embodiments, the feedback module includes instructions to project the feedback onto the projection surface using the projecting device. In some embodiments, the instructions to project the feedback include instructions to project a feedback image. In some embodiments, the instructions to project the feedback include instructions to project a feedback video.

In some embodiments, the feedback module includes instructions to provide the feedback audibly via a speaker.

In some embodiments, the feedback module includes instructions to transmit the feedback to a remote location, via a network.

In some embodiments, the challenge preparation module includes at least one of:

instructions to change a format of an image or a video of the selected challenge;

instructions to scale the image or the video of the selected challenge to a size suitable for the projecting by the projecting device;

instructions to scale the image or the video of the selected challenge to a size suitable for projection onto the projection surface;

instructions to divide the video of the selected challenge into a plurality of frames;

instructions to apply at least one filter to the image;

instructions to compensate for at least one of optical, geometric, and chromatic distortions arising from physical limitations of the projecting device; and instructions to compensate for at least one of optical, geometric, and chromatic distortions arising from physical limitations of the projection surface.

In some embodiments, the system further includes at least one speaker, wherein the challenge further includes an audio component, and the controller is adapted to provide the audio component to the user via the speaker.

In some embodiments, the challenge includes at least one of:

a writing challenge;

a drawing challenge;

an arithmetic problem challenge;

a spelling challenge;

a connecting dots challenge;

a puzzle challenge;

a maze challenge;

a phonetic challenge;

a portrait drawing challenge;

a matching game challenge; and a board game challenge.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1A:
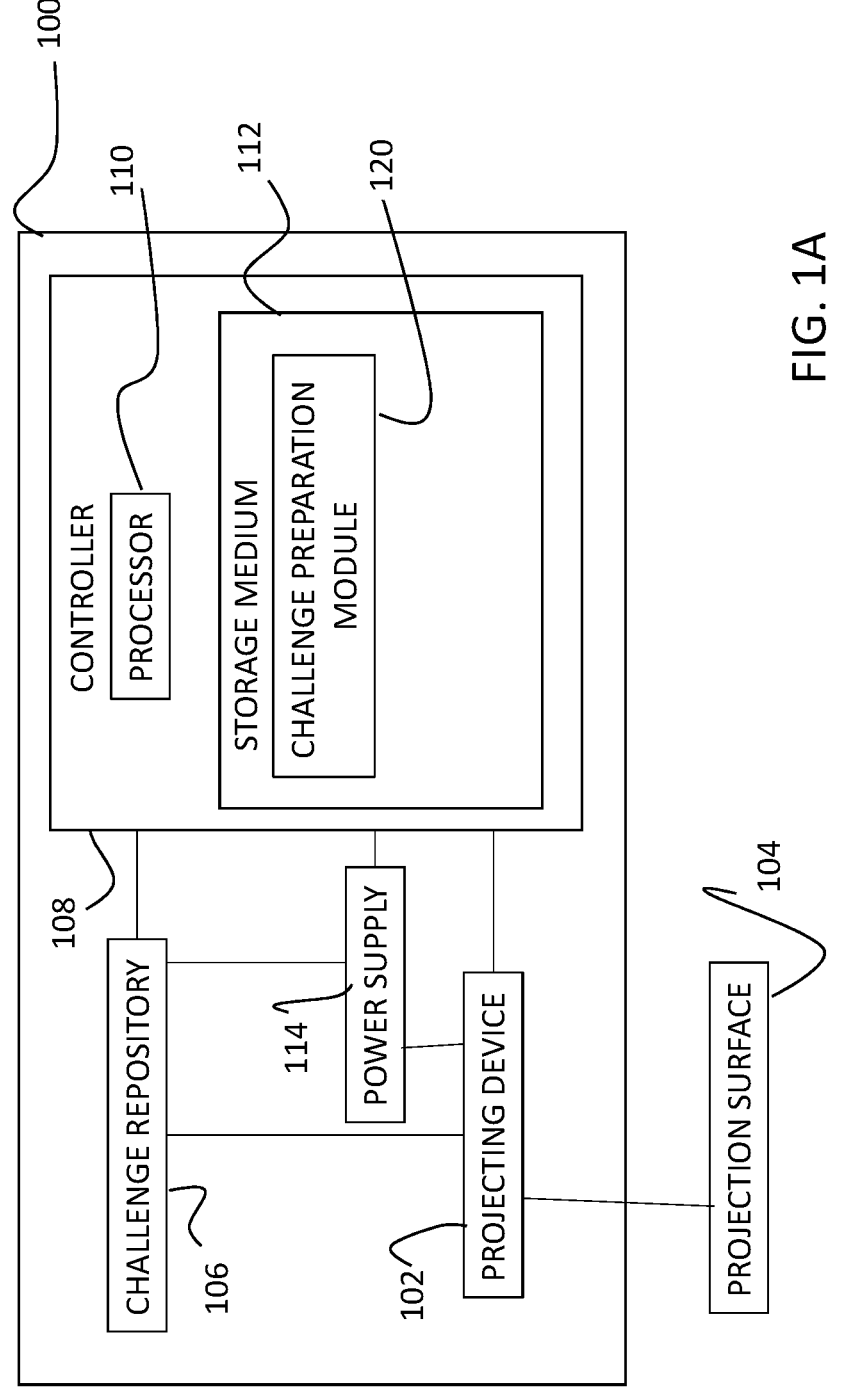
FIGS. 1A and 1B are simplified block diagram representations of embodiments of an interactive educational electronic toy system according to two embodiments of the teachings herein.

The invention, in some embodiments, relates to the field of electronic educational children's toys, and more specifically to an interactive educational toy system using a projecting device to project a challenge for a user to respond to, and, in some embodiments, a image capturing device to capture the user's response to the challenge.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

The system and method described herein are intended to provide an interactive environment in which a user, typically a child, is shown one or more challenges, and provides input in response to the challenge(s). In some embodiments, the user may receive feedback as to the accuracy of the response or of a method in which the response was provided. The feedback provided to the user may relate to the actual response, e.g. whether or not straight lines were used to write the letter A, or may relate to the method by which the response was given, e.g. whether the vertical lines of the letter A were drawn from the top down, whether the horizontal line of the letter A was drawn from left to right, and whether the user is holding the writing utensil correctly.

The challenges may be provided in a step-by-step manner, so as to teach the user to perform a more complex activity. For example, a series of challenges may teach the user to draw a specific object or to write a specific character, where each challenge within the series teaches the user to add another portion of the object or character. In response, the user is expected to mimic the presented image(s) maintaining the correct order in which the image(s) were presented. In some embodiments, the user must carry out tasks presented as the challenge, for example respond to an arithmetic problem, complete blanks in a textual or graphic based image, solve a crossword puzzle or other logic puzzle, or respond to a trivia question.

The system is designed to guide the user in achieving a goal defined by the challenge or series of challenges, and to allow the user to gradually progress to more complex challenges.

Figure 1B:
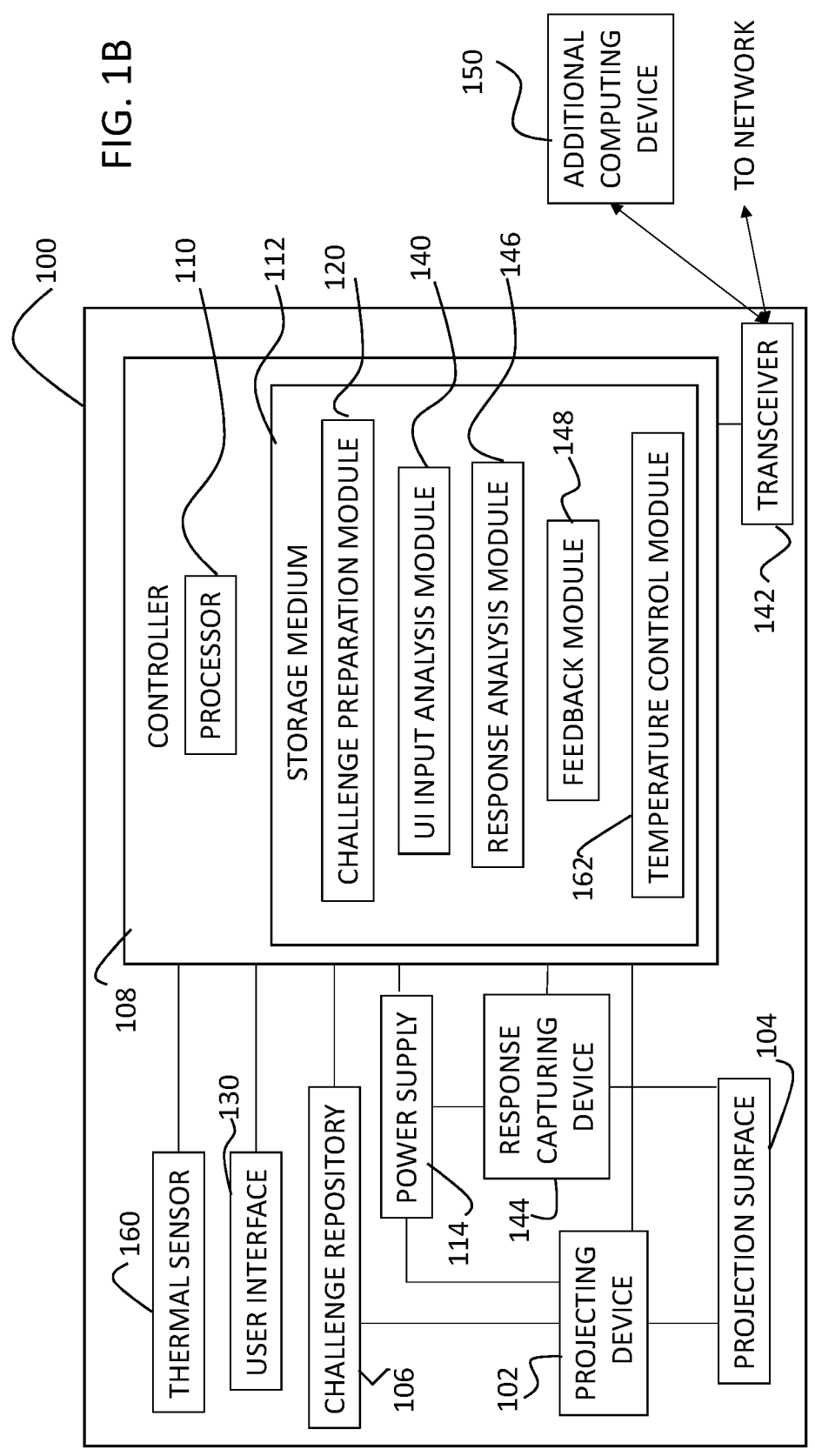
Figure 2B:
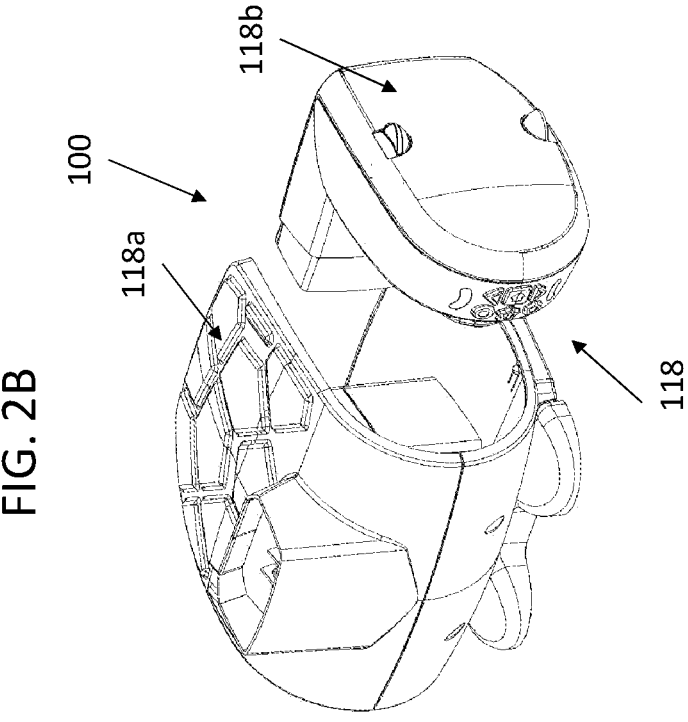
FIGS. 2A, 2B, and 2C are simplified perspective drawings of an embodiment of a system implementing the block diagram of FIGS. 1A and 1B, in a storage orientation, a transition orientation, and an operational orientation, respectively.
Figure 2A:
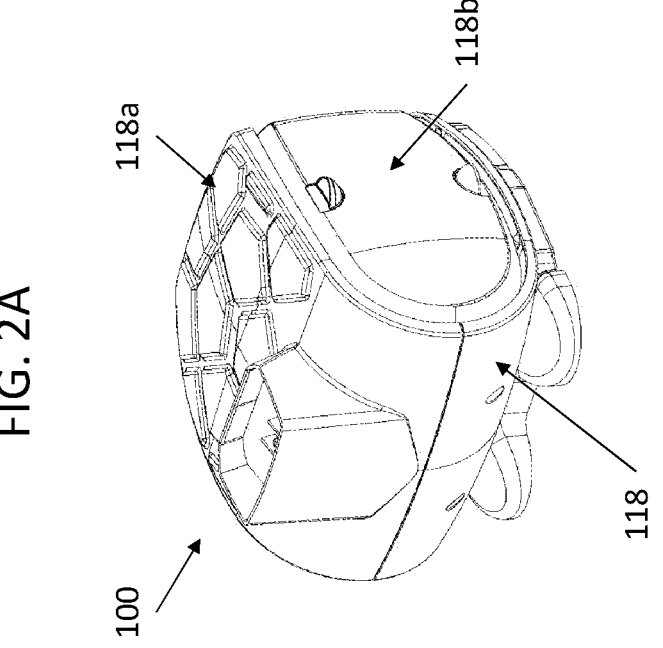
Figure 2C:
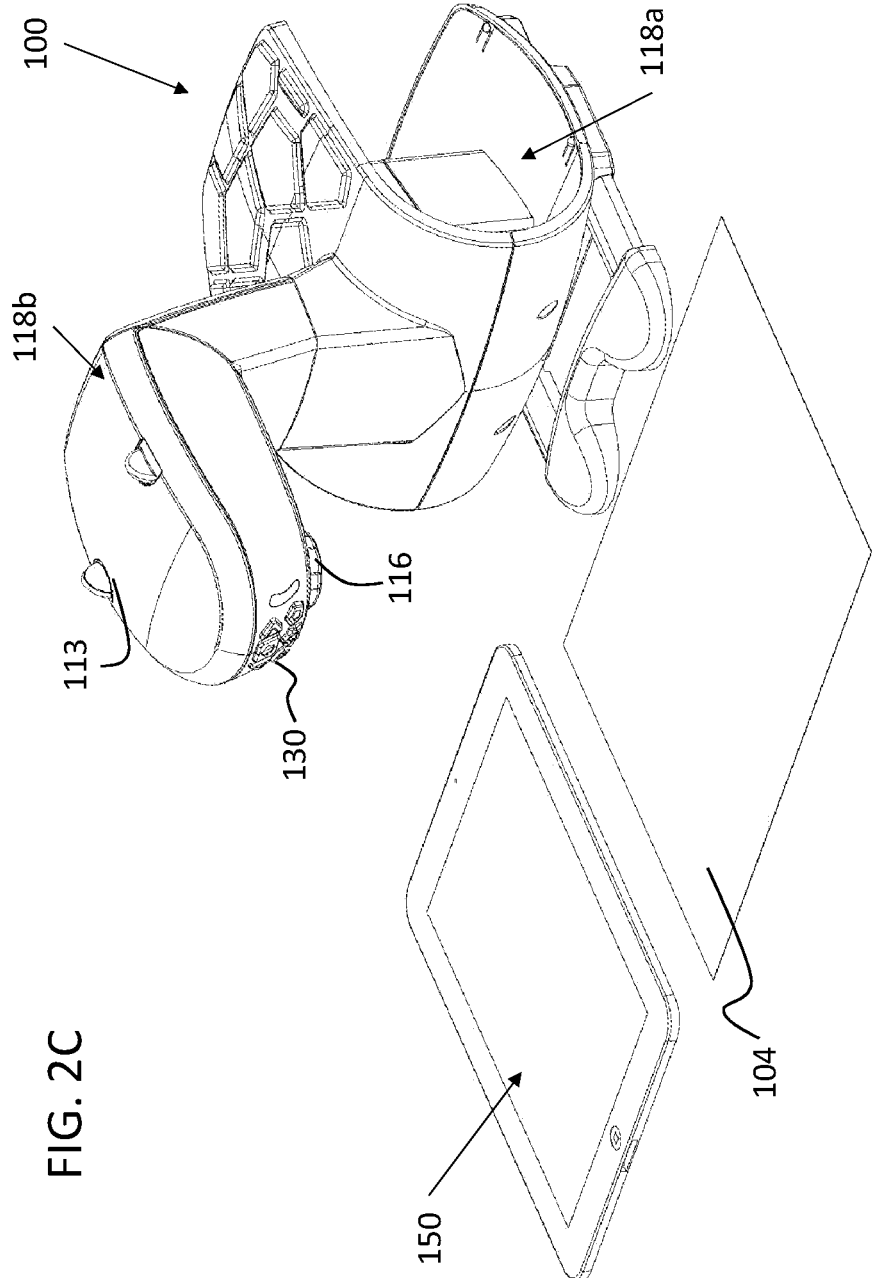

Reference is now made to FIGS. 1A and 1B, which are simplified block diagram representations of embodiments of an interactive educational electronic toy system 100 according to two embodiments of the teachings herein, and to FIGS. 2A, 2B, and 2C, which are simplified perspective drawings of an embodiment of a system implementing the block diagram of FIGS. 1A and 1B, in a storage orientation, a transition orientation, and an operative orientation, respectively.

As seen in FIGS. 1A and 1B, system 100 includes at least one projector, or projecting device 102, adapted to project one or more challenges, or images associated with challenges, onto a projection surface 104. The system 100 further includes, or is functionally associated with, at least one challenge repository 106 storing challenges to be presented to the user.

A controller 108 is adapted to control operation of the system, and is functionally associated with projecting device 102 and with challenge repository 106. The controller may include, or remotely communicate with, a processor 110, which may be functionally associated with a non-transitory computer readable storage medium 112 storing software modules including instructions to be executed by the processor 110. A power supply 114 is adapted to provide power to controller projecting device 102, controller 108, and/or challenge repository 106.

Projecting device 102 may be any type of projecting device suitable for projection of a challenge, in the form of an image and/or a video, onto the projection surface. For example, projecting device 102 may include an LCD (Liquid Crystal Display) projector, a DLP (Digital Light Processing) projector, an LCoS (Liquid Crystal on Silicon) projector or any other suitable projector that has electrical image/video inputs, employing either back or front projection. In some embodiments, projecting device may include at least one focusing element 116 to assist in focusing of a projected image, as clearly seen in FIG. 2C.

The projection surface 104 be a "built in" projection surface, forming part of the system 100, or may be an external projection surface, such as a paper, a table, a wall, or a surface of another device such as a tablet or a smart phone. The projection surface 104 may be horizontal, such as a tabletop, may be vertical, such as a wall, or may be at any other suitable angle, such as 1-179 degrees with respect to the horizontal. The projection surface may also be called an Input/Output (I/O) surface, since a projected image may be output onto the surface by the projecting device 102, and input may be provided by the user, via user interaction with the I/O surface, as explained in further detail hereinbelow.

The challenge repository 106 may be any suitable storage element for storing digital data, such as a database, a computer memory, or a buffering memory. The challenge repository 106 may be local to the system 100. For example the challenge repository 106 may be in the form of a data storage element, such as a removable memory card inserted into a dedicated slot 113 in system 100 (illustrated in FIG. 2C) or a database or memory component built into the system 100. In some embodiments, the challenge repository may be remote from system 100. For example, challenge repository 106 may be a database located remotely from system 100 and communicating therewith via a network, as explained in further detail hereinbelow.

In some embodiments, the challenge repository 106 is adapted to store, at least temporarily, large amounts of data, in the range of 5 MB to 500 MB. The challenge repository 106 may be particularly useful in buffering data flow between controller 108, projecting device 102 and/or image capturing devices forming part of the system as described hereinbelow, so as to reduce latency. In embodiments in which the challenge repository 106 is local to system 100, it may enable the system 100 to operate even when not in communication with a network or with another remote device. The challenge repository 106 may be volatile or non-volatile memory, such as a flash memory device, retaining the stored data, even when the power is switched off and on, thus accelerating the device start up time.

Power supply 114 may be any suitable power supply, such as a battery, a rechargeable battery, or a port for connection to a wall mounted socket or other power source. In some embodiments, system 100 is portable, and is designed to be operable without connection to an external power source, or at a distance greater than 1 meter from an external power source, for extended durations of time, in the range of 2-4 hours of non-stop operation.

A housing 118 typically houses the projecting device 102 and the controller 108. In some embodiments, the housing 118 may also house the power supply 114, the challenge repository 106, and or the projection surface 104.

In some embodiments, the housing 118 comprises a base portion 118a and a projector portion 118b. In some embodiments, the base portion 118a and the projector portion 118b may be separable from one another. In some such embodiments, the system 100 has a storage orientation in which projector portion 118b is stored within a suitable location in the base portion 118a, as illustrated in FIGS. 2A and 2B, and an operational orientation, in which the projector portion 118b is mounted onto base portion 118a, as illustrated in FIG. 2C. In some such embodiments, a footprint of the system 100 in the operational orientation is greater than a footprint of the system in the storage orientation.

A mentioned hereinabove, controller 108 includes, or remotely communicates with, processor 110 which is operative to execute instructions included in software modules stored in storage medium 112. Storage medium 112 includes a challenge preparation module 120, which is a software module adapted to prepare a challenge for projection onto projection surface 104 by projecting device 102. The challenge typically includes an image and/or a video, and such preparation may include:

changing a format of the image and/or video so as to use a format suitable for projecting device 102;

scaling the image and/or video to a size suitable for use by the projecting device 102 and/or adapted to the dimensions of projection surface 104 given a distance of the projecting device 102 therefrom;

applying at least one filter to the image and/or video; and/or dividing a video into individual sequential frames or images.

Challenge preparation module 120 may also employ image processing algorithms, so as to compensate for optical, geometric, and/or chromatic distortions arising from the physical limitations of projecting device 102 or of the projection surface 104. The prepared challenge image/video may then be transmitted, by the controller 108, to projecting device 102 for projection thereof of the image/video.

It is appreciated that in some embodiments, projecting device 102 may include a dedicated processor (not shown), and challenge preparation module 120 may run as a local thread on the processor of projecting device 102. In some such embodiments, projecting device 102 would receive as input from controller 108 an initial image/video, and the initial image/video would be prepared for projection by challenge preparation module 120 running on the dedicated processor of projecting device 102.

It is appreciated that in embodiments in which the challenge is audible, or also audible, the challenge preparation module 120 may also be adapted to prepare audio associated with the challenge for being played on an audio speaker element associated with controller 108, for example by adjusting the volume, pitch, or voice of the speaker providing the challenge. In some embodiments, the audio speaker element may form part of system 100, for example as part of the projecting device 102. In other embodiments, the audio speaker element may be separate from system 100, as described in further detail herein below.

Turning now to FIG. 1B, the Figure shows a system 100 including all the components of the system of FIG. 1A, as well as additional components which may, in some embodiments, form part of a system according to the present invention.

Figure 3:
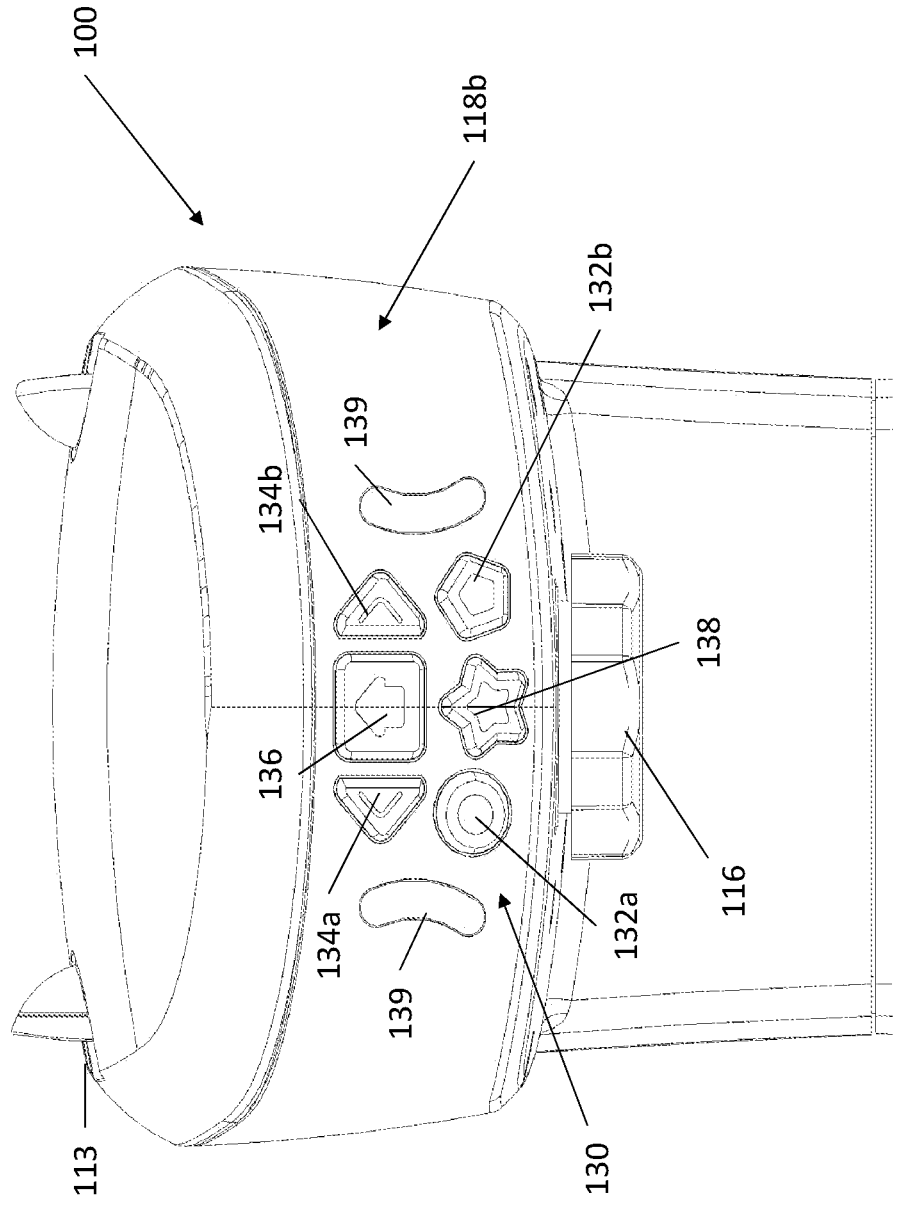
FIG. 3 is a simplified perspective drawing of a user interface section of the system of FIGS. 2A to 2C.

In some embodiments, the system may include a user interface 130, which may for example be disposed on an exterior surface of the housing 118, for example as illustrated in FIGS. 2C and 3. The user interface may include any suitable buttons and/or other input or output elements. For example, in the embodiment illustrated in FIG. 3, the user interface may include buttons 132*a* and 132*b* adapted for navigating between challenges in the challenge repository (moving to the previous and next challenge, respectively), buttons 134*a* and 134*b* for navigating between steps of a multi-step challenge, as described in further detail hereinbelow, a "home" button 136 for returning to the first step of the first challenge in the challenge repository, and a "repeat" button 138 for repeating the last step of the challenge currently being completed. In some embodiments, the user interface 130 additionally includes visual indicators 139, such as LED lights, for indicating to the user when the processor is communicating with another device or for providing any other indication to the user. In some embodiments, different colors of illumination or different flashing patterns of light emitted by the visual indicators 139 may indicate different types of communication or actions being carried out by the system.

In some embodiments, some of the buttons of the user interface may have more than one function. For example, the "home" button 136 may function as described above when pressed briefly, and, upon a longer press by the user, may control the speed at which an animation or video is projected. As another example, the "repeat" button 138 may repeat the most recent challenge step when pressed briefly, and if pressed for a longer time may turn on or off an "auto-play" mode of the steps of the challenge, where the projector moves to the next challenge step automatically after a predetermined duration of projecting the current challenge step.

In some embodiments, for example in embodiments in which voice commands may be provided to controller 108, the user interface 130 may further include a microphone (not shown) or other element adapted to capture a voice command from the user. In some embodiments, in which the challenge is audible or has audio associated therewith, the user interface 130 may further include a speaker or other audio providing element (not shown) for providing the audible output to the user.

In embodiments in which the system 100 includes a user interface 130 as described, storage medium 112 of controller 108 further includes a UI (user interface) input analysis module 140, which is a software module adapted to identify input received by the user via user interface 130 (for example to identify what button was pressed or what voice command was provided via a microphone), and to control the projecting device 102 such that it changes the projected image in response to the input received from the user.

In some embodiments, system 100 may further include a transceiver 142, enabling two way communication with a networked environment, for example via a Local Area Network (LAN), a Wide Area Network (WAN), or via the Internet. The two-way communication may be wired communication or wireless communication, and may use any suitable protocol known in the art. In such embodiments, power supply 114 provides power also to transceiver 142.

Transceiver 142 is particularly useful when the challenge repository 106 is remote from system 100, such that a challenge may be selected from the challenge repository 106 and provided to the controller 108 via the transceiver 142. In some embodiments, the transceiver 142 may be used to provide to controller 108 input to be presented to the user, the input received from a remote location via the transceiver. For example, the challenge provided to the user may be electronically defined by a remote guide, such as a teacher or other educational professional, therapist, and the like, and transmitted to the controller 108 of the system 100 operated by the user via transceiver 142.

In some embodiments, the system 100 may further include at least one response capturing device 144, which may be functionally associated with controller 108 and which may be adapted to capture one or more images of the projection surface 104, of the vicinity of the projection surface 104, and/or of the user interacting with the projection surface 104, so as to capture the user's response to a challenge projected onto projection surface 104 by projecting device 102. The response capturing device 144 provides the captured image(s) to controller 108. For clarity, the following description relates to a single response capturing device 144, though it is appreciated that any suitable number of image capturing devices may be used.

Response capturing device 144 may be any suitable image capturing devices, including an image sensor, an image signal processor, a two-dimensional stills camera, a two-dimensional video camera, a three-dimensional stills camera, or a three-dimensional video camera. Response capturing device 144 is arranged so as to capture one or more images of the projection surface 104 into an encoded digital format, so as to capture the multi-dimensional spatial and/or temporal image of the projection surface 104. When multiple response capturing devices 144 are used, they may be arranged so as to capture images of projection surface 104 from different angles and/or vantage points.

It is appreciated that in embodiments in which a challenge response is (also) audible, the response capturing device 144 may include one or more audio capturing devices, such as microphones. However, as described above, the audio capturing device(s) may also, or alternately, be included in the user interface 130.

In some embodiments, the response capturing device 144 is movable relative to projection surface 104, for example by being mounted onto a movable arm. In such embodiments, response capturing device 144 may also capture one or more images of locations in or surrounding system 100, other than projection surface 104.

In some embodiments, a response captured by response capturing device 144 may be transmitted, for example via transceiver 142, to a remote location, for example to a location preset by the user when determining the settings of controller 108. For example, in an embodiment in which the challenge is designed to teach a child how to draw, an image of the child's drawing may be transmitted to the parent. As another example, when the challenge is a penmanship or spelling challenge, an image of the user's response may be provided to a teacher who assigned the challenge.

In embodiments in which the system 100 includes a response capturing device 144 as described hereinabove, storage medium 112 of controller 108 may further include a response analysis module 146, which is a software module adapted to receive data, such as one or more images or a voice response, captured by response capturing device 144, and to analyze the captured response so as to determine whether or not the user has correctly responded to the challenge.

In some embodiments, in which the response capturing device 144 captures one or more images of the response provided by the user, the response analysis module 146 may implement computer vision and/or machine learning algorithms to compute an error function and to determine whether the response provided by the user as captured, as an image, by response capturing device 144 matches an expected input, or is correct. The algorithms used by response analysis module 146 may include algorithms for two-dimensional pattern matching and/or algorithms for three dimensional depth analysis of the captured image or images.

Response analysis module 146 may also employ image processing algorithms, so as to compensate for optical, geometric, and/or chromatic distortions arising from the physical limitations of Response capturing device 144. In some embodiments, the response analysis module 146 may further analyze the methodology by which the user provides the response to the challenge, such as, for example, the order in which the lines of a challenge are drawn, the direction in which the lines of a challenge are drawn, or the grip of a writing utensil, and may determine whether this needs to be corrected.

It will be appreciated that in embodiments in which the challenge is (also) audible, the response analysis module 146 may also use speech recognition algorithms and other algorithms suitable for determining whether the audio input captured by response capturing device 144 or by an audio capturing component of user interface 130 corresponds to the expected input.

In embodiments, storage medium 112 of controller 108 may further include a feedback module 148, adapted to use results of the analysis conducted by response analysis module 146, and to generate feedback for transmission to the user. The feedback may be visual feedback, provided for example on the projection surface 104 via projecting device 102, or audio feedback, provided via an audio output system (e.g. speakers, not shown) functionally associated with controller 108 and/or with projecting device 102, tactile feedback provided via a vibration engine (not shown) or associated with controller 108, or any other suitable type of feedback.

In some embodiments, feedback module 148 may provide feedback relating directly to the user's response to the challenge. For example, if the challenge is to trace the letter 'A', the feedback module may provide feedback relating to the straightness of the traced lines or the correctness thereof. Feedback module 148 may additionally provide feedback relating to the methodology by which the user completed the challenge, for example relating to steps taken to solve the challenge, or to physical characteristics applied while solving the challenge such as the grip of a pencil or pen. In the example of tracing the letter 'A', the feedback module may provide feedback to indicate whether or not the lines of the letter were traced in the correct order and/or in the correct direction, and/or may provide feedback relating to the user's grip of the pencil while tracing the letter.

In some embodiments, controller 108 or a portion thereof may be part of, or may be in communication with, an additional computing device 150 (FIG. 2), for example via transceiver 142. In some embodiments, the additional computing device 150 may be a handheld or mobile computing device, such as a suitably equipped mobile telephone or tablet computing device, while in other embodiments the additional computing device may be a computing device in a fixed location, such as a desktop computer. In some such embodiments, an application may be operated on the additional computing device 150 so as to enhance the user's experienced interfacing with the system 100, as well as to reduce load on controller 108 or processor 110 by serving as a low-level tool for off-loading tasks from controller 108. Such tasks may include data transportation, temporary or permanent data storage and manipulation, algorithmic calculations, networked tasks, and the like. The additional computing device 150 may function in a slave capacity or in a master capacity. In some embodiments, the additional computing device 150 may be placed in close proximity to system 100, or may lean on housing 118 of system 100 at a specifically allocated position, so as to form a virtual extension of the system 100.

In some embodiments, the application running on the additional computing device 150 provides a second user interface, allowing the user to select challenges from challenge repository 106 and to move between steps of a challenge. In some such embodiments, the application is synchronized with controller 108, such that any action taken on user interface 130 is reflected in the application, and vice versa.

In some embodiments, built-in components of the additional computing device 150 may be used for providing the challenge to the user or for receiving the user's response to the challenge. For example, in embodiments in which the challenge is (also) audible, the audio of the challenge may be provided to the user via a speaker system built into additional computing device 150. As another example, in embodiments in which the challenge response is (also) an audio response, the audio response may be captured by a microphone component of the additional computing device 150, and transferred therefrom to controller 108, for example via transceiver 142.

In some embodiments, the challenge response captured by response capturing device 144 and/or the feedback generated by feedback module 148, may be provided to the user via additional computing device 150, for example as visual feedback provided on a display of the additional computing device or as audio feedback provided via the speaker of the additional computing device.

In some embodiments, system 100 may further include an inactivity sensing functionality adapted to identify when the system 100 has been inactive for a predetermined duration, and to provide such information to controller 108 for adapting operation thereof so as to preserve power consumption by the system 100 when it is inactive. In some such embodiments, the inactivity sensing functionality may form part of response capturing device 144 or may be a software module adapted to analyze images captured by the response capturing device to identify inactivity. In some embodiments, the inactivity sensing functionality may be a software module running on controller 108 and identifying when no change has been made to the projected image for a predetermined duration. In other embodiments, the inactivity sensing functionality may operate based on input received from a proximity sensor, a motion sensor, or an audio sensor forming part of system 100.

In some embodiments, in response to detection of inactivity by the inactivity sensing functionality, processor 110 of controller 108 and/or other processors included in system 100 may run a low power efficiency power scheme adapted to conserve power in system 100, which scheme may trigger actions such as dimming of one or more light sources associated with projecting device 102, reducing a frequency of image or audio capturing by response capturing device 144, shutting down non-critical modules, and the like.

In some embodiments, the system 100 further includes a thermal sensor 160, adapted to provide input to controller 108 react when a temperature level in system 100 exceeds a predetermined threshold. The processor 110 of controller 108 may then operate a temperature control module 162 to adjust the operation of system 100 to the elevated temperature level, for example by shutting down system 100, or by notifying the user of the elevated temperature, thereby to provide for safe and robust device operation. The user notification may be provided, for example, by projection of a warning message onto projection surface 104 by providing a visual warning message on a display of additional computing device 150, or by providing an audible warning signal via a speaker, such as a speaker of additional computing device 150 or a speaker forming part of user interface 130.

It is appreciated that for ease of understanding, all the software modules disclosed herein, including challenge preparation module 120, UI input analysis module 140, response analysis module 146, feedback module 148, temperature control module 162, and the inactivity sensing module are illustrated being stored in storage medium 112 of controller 108 for operation by processor 110. However, it is appreciated that any one or more of these modules may also run on a processor remote to controller 108 and in communication therewith via transceiver 142, such as for example a processor of additional computing device 150.

Figure 4A:
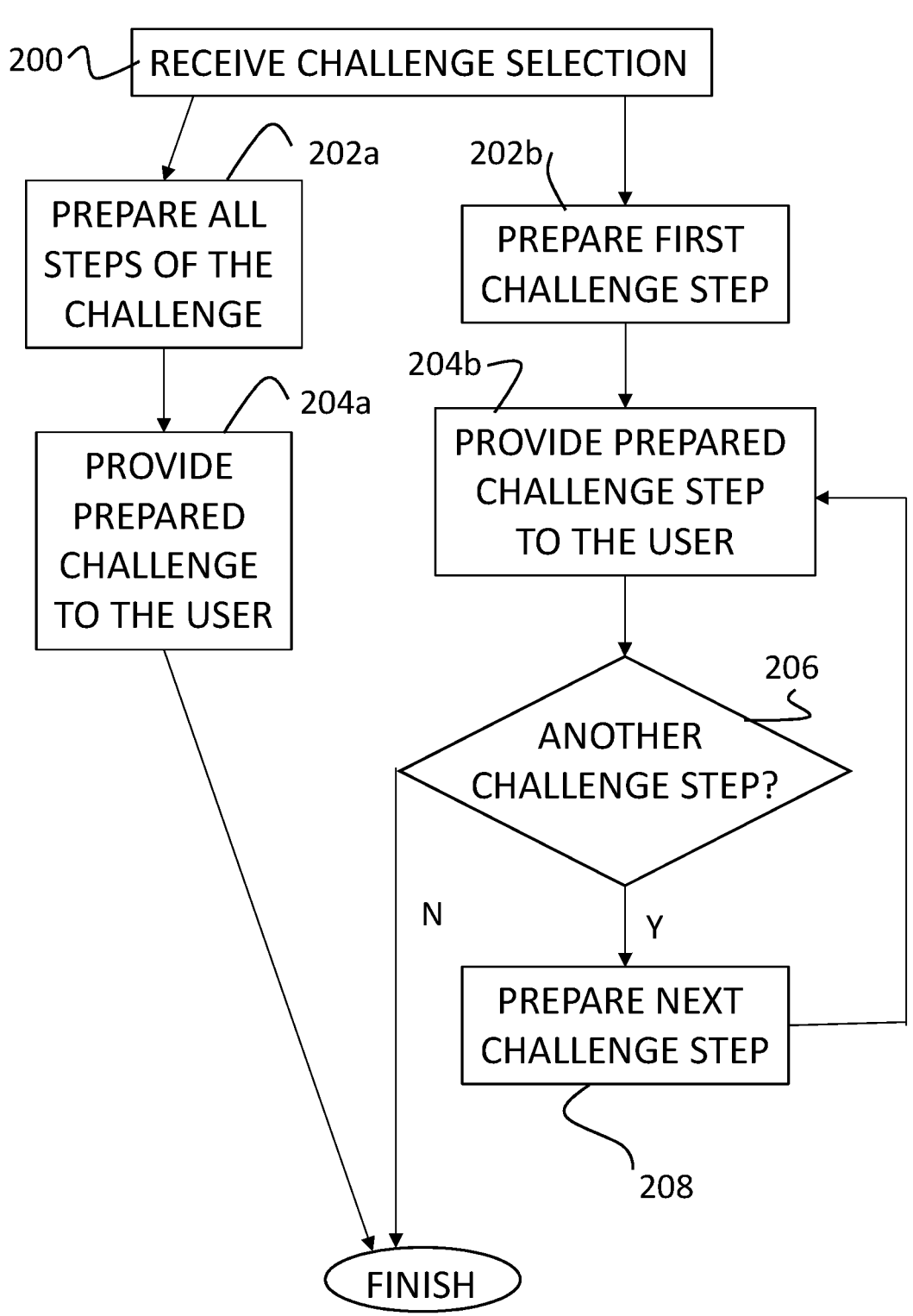
FIGS. 4A and 4B are flowcharts of embodiments of exemplary methods of using the systems of FIGS. 1A and 1B, respectively.
Figure 4B:
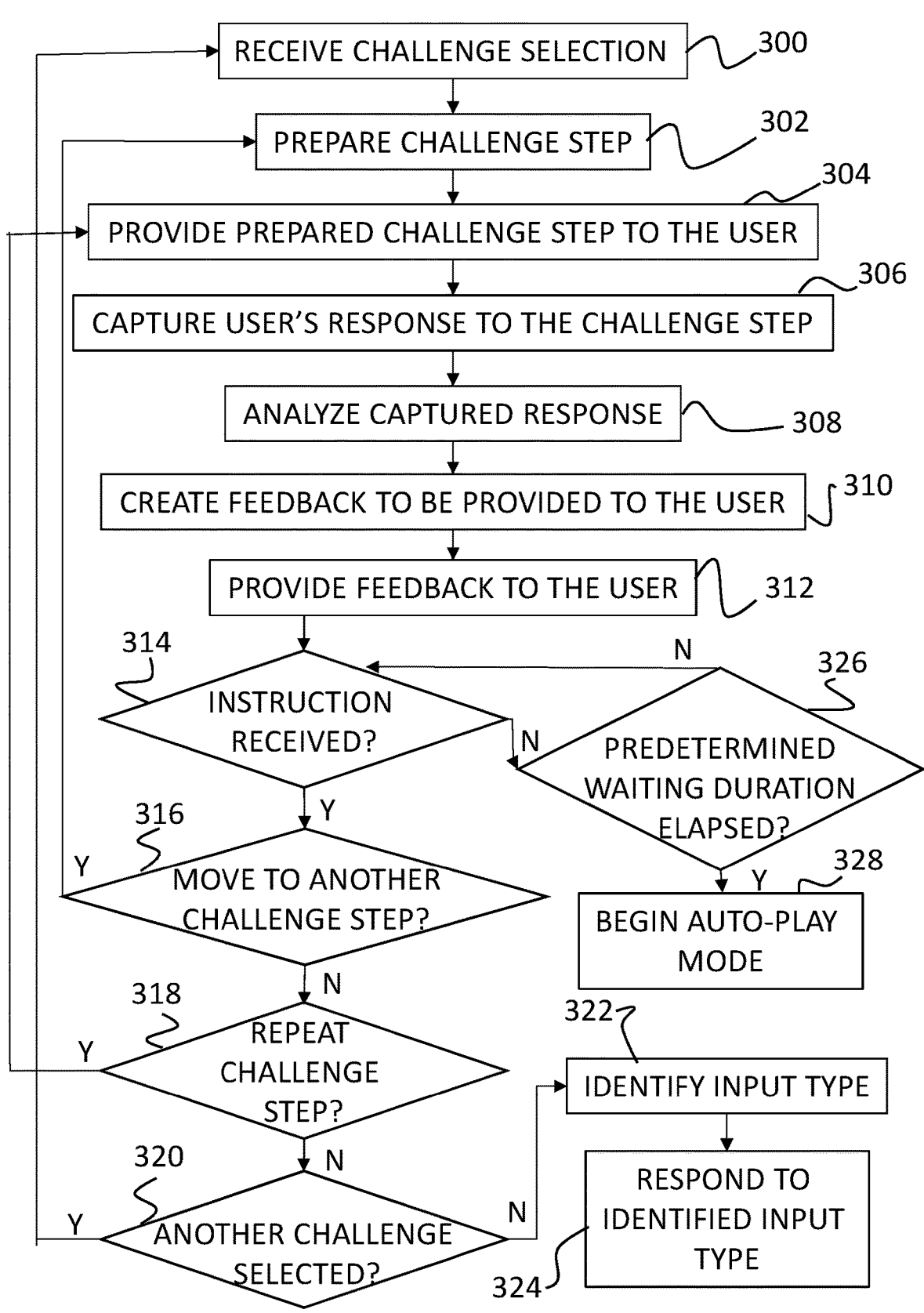

Reference is now additionally made to FIGS. 4A and 4B, which are flowcharts of embodiments of exemplary methods of using the systems of FIGS. 1A and 1B, respectively. It is appreciated that though the description hereinbelow relates to specific elements of systems 100 shown in FIGS. 1A and 1B, this is merely an example used to enhance clarity, and any suitable device may be used in implementation of the methods of FIGS. 4A and 4B.

As seen in FIG. 4A, at step 200 a selection of a challenge to be provided to the user is received by controller 108. The challenge is typically selected from challenge repository 106.

In the embodiment of FIGS. 1A and 4A, the challenge repository may include a single challenge, and selection of the challenge is carried out by associating the challenge repository with controller 108. For example, the challenge repository may be a computer storage drive, such as an SD card, USB drive, or the like, including a single challenge. As such, the challenge is selected by selecting a suitable challenge repository and inserting it into a suitable slot or port, such as slot 113, in system 100, so as to associate the computer storage drive with the controller 108.

In some embodiments, the challenge is automatically selected by the controller 108, for example based on a user profile including information about the user, such as the user's age, challenge completion level, educational/therapeutic needs, and user preferences.

The challenge may be in the form of an image, a video clip, or audio instructions, and may be a challenge to be mimicked by the user (e.g. trace a letter that the user will learn to write, trace a picture that the user will learn to draw) or a task to be completed by the user (e.g. solve an arithmetic problem, answer a trivia question, or solve a puzzle).

In some embodiments, the challenge may be a multi-step challenge including a plurality of challenge steps, so as to allow the user to complete the challenge in a step-by-step manner. For example, the challenge may teach the user to write a letter or draw an object by breaking the letter/object into individual lines/curves, and providing different challenge steps for each line/curve or group thereof.

The challenge may be any suitable challenge which may be provided to the user by system 100, as described herein. In some embodiments, the challenge may include any one or more of the following types of challenges:

learning to write, or trace, a character such as a letter or a number;

learning to sketch, draw, or trace, an image of an object;

solving an arithmetic problem;

learning how to spell, for example filling in the blank letter in a word to obtain a correctly spelled word, or spelling a word associated with a picture;

connecting numbered or other dots to form a drawing ("connect-the-dots");

solving a puzzle, such as a crossword puzzle, soduku, word search, unscrambling words, boggle, and the like;

solving a maze, for example helping the mouse find the cheese;

solving a phonetic challenge, for example finding two words with the same phonetic sound, or finding a word with a specific phonetic sound;

tracing an image captured in the real world by an image capturing device;

learning how to draw a portrait;

matching game, such as connecting two corresponding images or letter by a line, circling the two images or characters that match, and the like; and playing board games, such as battleship, tic-tac-toe, minesweeper, and the like.

The selected challenge is then prepared for being provided to the user, for example by challenge preparation module 120. In some embodiments, in which the challenge is, or includes, an image, the preparation includes processing of the image to accommodate the conditions in which the challenge is to be provided, such as the specific projection surface and illumination conditions in the vicinity of system 100.

When using the device of FIG. 1A which does not include a user interface, and when the challenge includes more than one challenge step, preparation of the challenge includes preparing the challenge steps to be provided to the user in sequence. In some such embodiments, each of the challenge steps is prepared by the challenge preparation module 120 in advance of display of any challenge steps, as illustrated at step 202a. In other embodiments, the preparation of the challenge includes preparation of the first challenge step, as illustrated at step 202b, and subsequent challenge steps are prepared during projection of the previous challenge steps, as described herein.

If the challenge has been fully prepared, for example the challenge includes a single step or all the challenge steps have been prepared at step 202a, the prepared challenge is then provided to the user at step 204a. This may be carried out by projecting the challenge onto projection surface 104 by projecting device 102, and/or by providing audio associated with the challenge to the user via a speaker. In some embodiments, in which the challenge includes multiple challenge steps, the steps are provided to the user in sequence, each step being provided for a predetermined duration before providing the next step.

However, if the preparation of the challenge included only preparation of the first challenge step, that challenge step is provided to the user in step 204b, and concurrently with providing the challenge step to the user, the controller 108 evaluates whether there is another challenge step to be provided to the user at step 206, and if there is another step to be provided to the user, at step 208 the controller prepares the next challenge step for provision to the user, as described hereinabove. When the predetermined duration for providing the previous step to the user has passed, the next step is now prepared for providing to the user, and is provided to the user at step 204*b* as described herein.

Turning now to FIG. 4B, at step 300 a selection of a challenge to be provided to the user is received by controller 108. The challenge is typically selected from challenge repository 106.

The challenges may be substantially as described above with respect to FIG. 4A. In some embodiments, selection of the challenge may be as described above with respect to FIG. 4A.

In some embodiments, in which the challenge repository 106 is local to system 100 and includes more than one challenge, the selection of a desired challenge is provided to controller 108 from user interface 130 via UI input analysis module 140. For example, the user may insert a computer storage drive, such as an SD card or a USB drive, into a suitable slot (113) in system 100, so as to connect a specific challenge repository, and then select a specific challenge from the challenge repository or computer storage drive by operating the buttons of user interface 130, as described hereinabove.

In some embodiments, the challenge repository 106 is remote from system 100, such as a database provided on a network in communication with system 100 via transceiver 142. In such embodiments, the user or a guide thereof, such as a teacher, educational professional, therapist, paramedical professional, or the like, may select a challenge from the challenge repository operating a user interface associated with the network or the database, and the challenge may be provided to controller 108 via transceiver 142. For example, the user may access a networked database of challenges, located on the Internet, via a browser of additional computing device 150, and may select a desired challenge which will be transmitted from the additional computing device 150 to controller 108 via transceiver 142.

In some embodiments, the challenge may be generated by the user using an image capturing device, such as a camera. For example, the user may capture an image of his or her surroundings using a camera of additional computing device 150. The captured image may be processed to form an outline image or a coloring page image, for example as disclosed in U.S. patent application Ser. No. 15/060,038 filed Mar. 3, 2016, which is incorporated by reference as if fully set forth herein. The outline image may then be provided directly to controller 108 as the challenge image to be traced, or may be placed in challenge repository 106 and selected therefrom as described hereinabove.

At step 302, the selected challenge, if the challenge is a single step challenge, or a first challenge step of a multi-step challenge prepared for being provided to the user, for example by challenge preparation module 120. In some embodiments, in which the challenge is, or includes, an image, the preparation includes processing of the image to accommodate the conditions in which the challenge is to be provided, such as the specific projection surface and illumination conditions in the vicinity of system 100.

The prepared challenge or challenge step is then provided to the user at step 304. This may be carried out by projecting the challenge onto projection surface 104 by projecting device 102, and/or by providing audio associated with the challenge to the user via a speaker. In some embodiments, in which the challenge includes multiple challenge steps, the steps are provided to the user in sequence, each step being provided for a predetermined duration before providing the next step.

In some embodiments, at step 306, the response capturing device 144 captures the user's response to the challenge, which may be provided, for example, by writing or drawing on projection surface 104, providing audio input to system 100, placing one or more physical items on or near projection surface 104, or by use of specific hand gestures or movements as defined in the challenge. In some embodiments, the user's response is captured in one or more images captured by the response capturing device. In some embodiments, the user's audio response is captured by a microphone forming part of or associated with the response capturing device.

In some embodiments, at step 308, the captured user response is analyzed by response analysis module 146, so as to determine whether the response provided by the user was correct, and whether it was provided in the correct manner. For example, if the challenge was writing the letter 'A', the response analysis module 146 may determine from the captured input whether the resulting letter 'A' written by the user is correct, as well as whether the order in which the user wrote the letter 'A', the directions in which the user wrote the lines of the letter 'A', and the way the user gripped the writing utensil while writing are correct.

In some embodiments, at step 310, feedback module 148 uses the results of the analysis conducted at step 308 to create feedback for provision to the user. The feedback may be visual feedback, for example showing the user how the pencil should be held while writing or showing the user in a video clip the order/direction in which the lines of the letter 'A' should be written, or may be audio feedback, for example explaining to the user that the letter 'A' should be written from the top down, and instructing the user to try again. The feedback is provided to the user at step 312, for example via projecting device 102 and/or a speaker associated therewith or with controller 108.

In some embodiments, the feedback module may also provide feedback to a remote device or location, such as a device operated by a parent, teacher, therapist, or other guide.

Controller 108 awaits additional user instructions, provided via the user interface 130 or a user interface of the additional computing device 150, at step 314. When new input has been received, the UI input analysis module 140 determines whether the input was an instruction to move to another challenge step at step 316. If the input was an instruction to move to another challenge step, the method returns to step 302, where the another challenge step is prepared for providing to the user.

Otherwise, the UI input analysis module 140 determines whether the input was an instruction to repeat the step at step 318. If the input was an instruction to repeat the step, the method returns to step 304 and again provides the same step to the user.

If at step 318 the instruction was not to repeat the step, the UI input analysis module 140 determines whether the input was a selection of another challenge at step 320. If the input was the selection of another challenge, the method returns to step 302 for preparation of the new challenge for provision to the user.

Otherwise, the UI input analysis module 140 identifies the type of input provided from the user interface at step 322, and the controller 108 responds accordingly at step 324, for example by turning on an auto-play mode of the challenge or changing a speed in which the challenge is displayed.

In some embodiments, if no input was received from the user interface, the controller 108 determines whether a predetermined time duration has passed since input has been received at step 326, and if the predetermined duration has passed, the controller 108 may, at step 328, begin processing and displaying the challenge in "auto-play" mode, as described hereinabove with respect to FIG. 4A. Alternately, if the predetermined time duration has passed, the system may begin to operate as required when the inactivity sensing functionality has indicated inactivity of the system.

It is appreciated that though the description herein relates to capturing the user response, analyzing the user response, and providing feedback to the user for each challenge step individually, these actions may be carried out only once after the whole challenge has been completed, only after some of the challenge steps, or need not be carried out at all.

It is further appreciated that in some embodiments, in which the challenge is presented in auto-play mode, the system does not await input from the user interface, and the challenge steps are prepared and presented in sequence, for example as described hereinabove with respect to FIG. 4A, with the possibility of analysis of the user's response and providing feedback to the user within the auto-play provision of the challenge steps.

FIGS. 5A, 5B, 5C, and 5D are simplified perspective drawings of another embodiment of a system 400 implementing the block diagram of FIG. 1A in a closed orientation, a storage access orientation, and two operational orientations, respectively. The embodiment of FIGS. 5A to 5D is highly portable, and is particularly useful "on the go", for example during long drives or flights.

As seen in FIGS. 5A to 5D, system 400 includes at least one projector, or projecting mechanism, adapted to project one or more challenges, or images associated with challenges, onto a projection surface. Typically, the projector and the projection surface are combined in the form of a screen 405. The system 400 further includes, or is functionally associated with, at least one challenge repository 406 storing challenges to be presented to the user.

A controller is adapted to control operation of the system, and is functionally associated with screen 405 and with challenge repository 406. The controller may include, or remotely communicate with, a processor, which may be functionally associated with a non-transitory computer readable storage medium storing software modules including instructions to be executed by the processor, substantially as described hereinabove. A power supply is adapted to provide power to operate the screen, controller, and/or challenge repository.

Figure 5A:
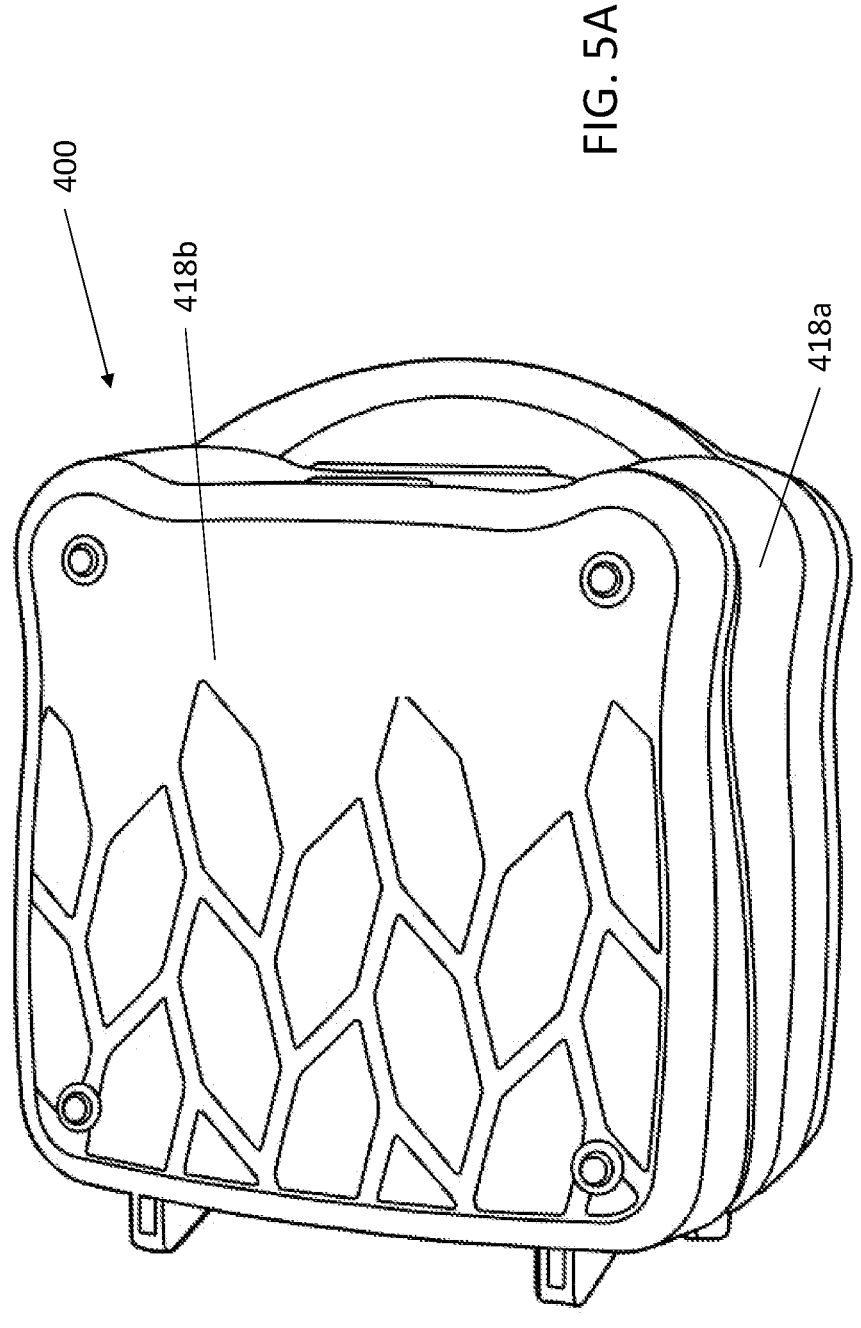
FIGS. 5A, 5B, 5C, and 5D are simplified perspective drawings of another embodiment of a system implementing the block diagram of FIG. 1A in a storage orientation, a transition orientation, and two operational orientations, respectively.
Figure 5B:
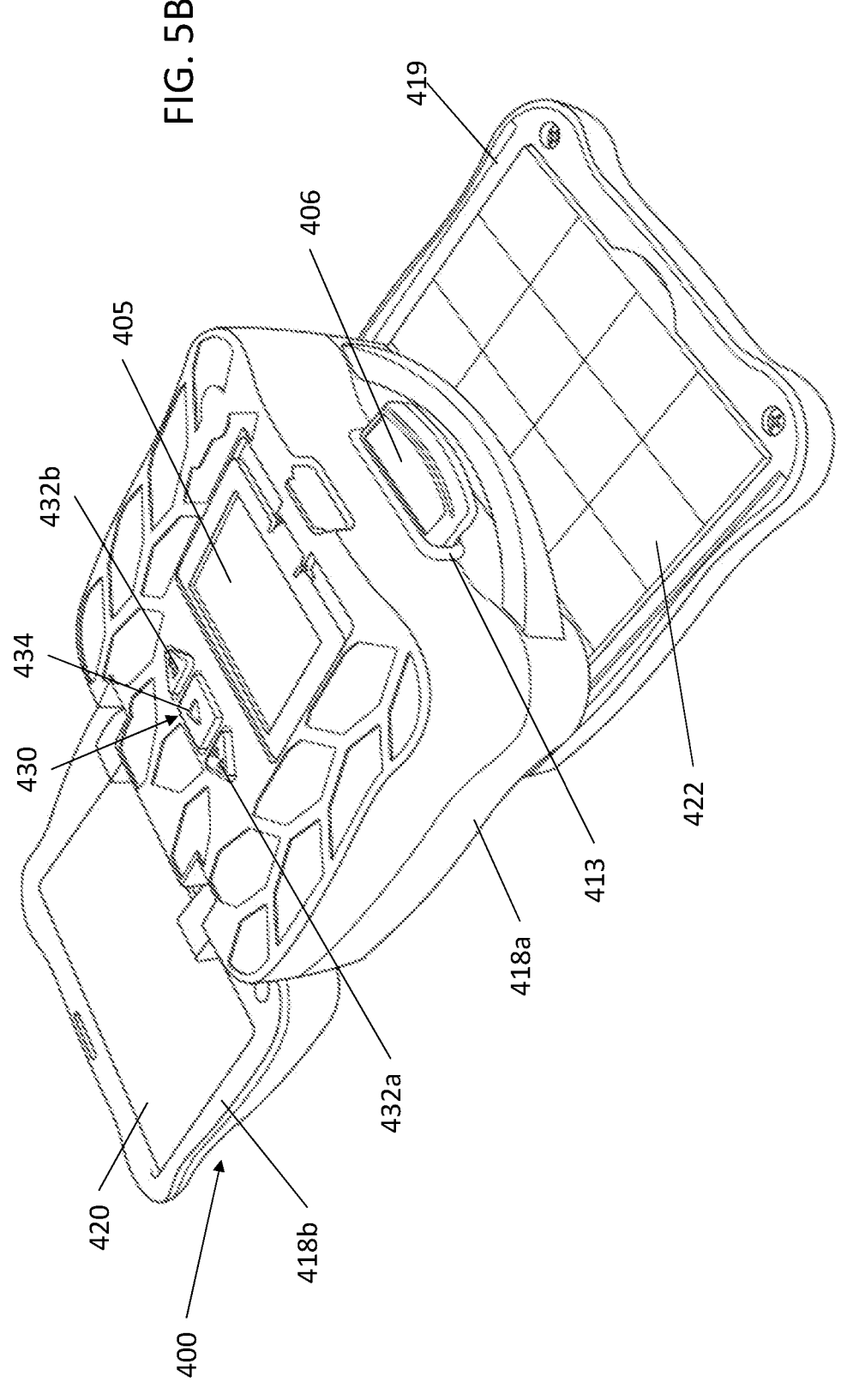
Figure 5C:
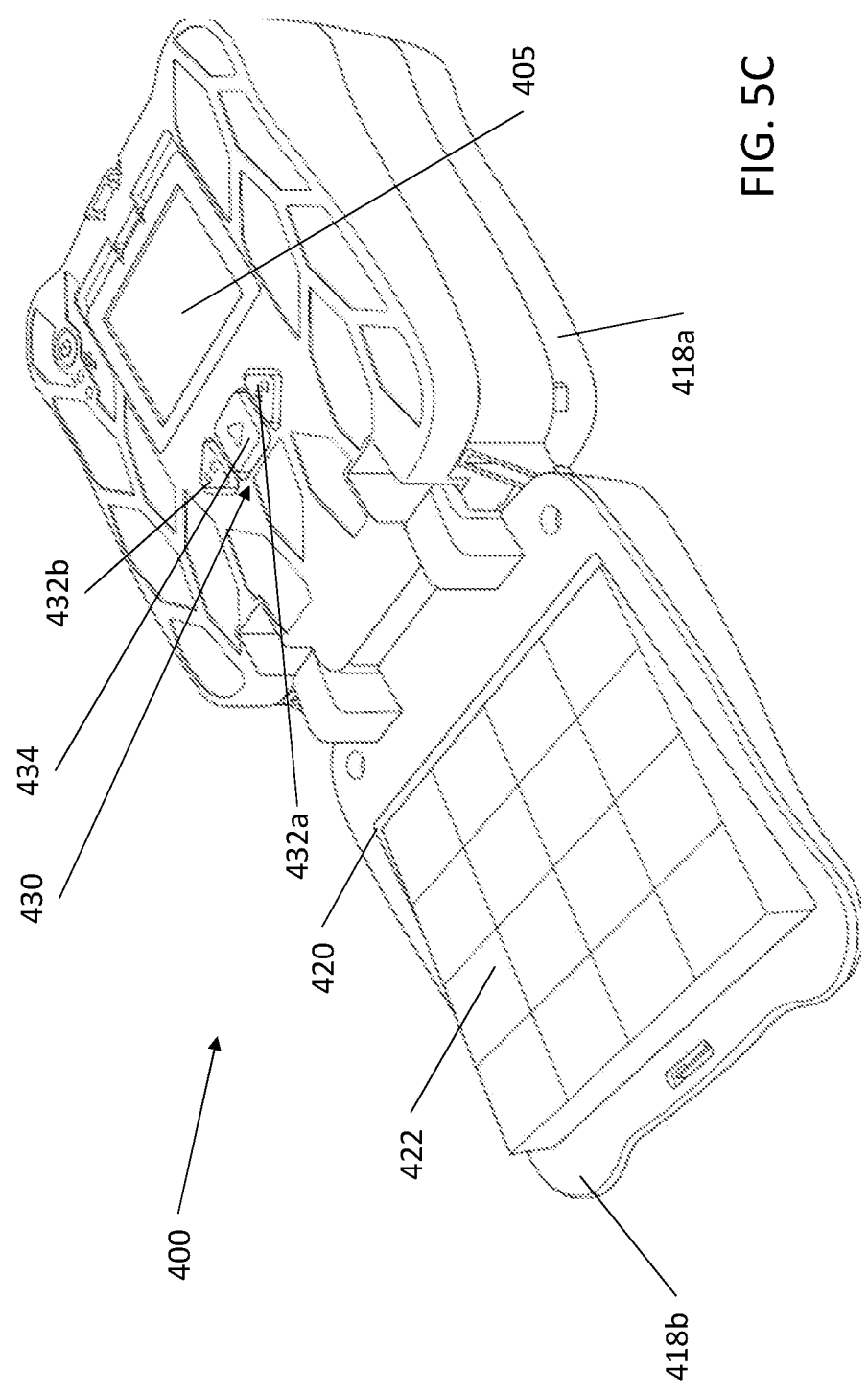
Figure 5D:
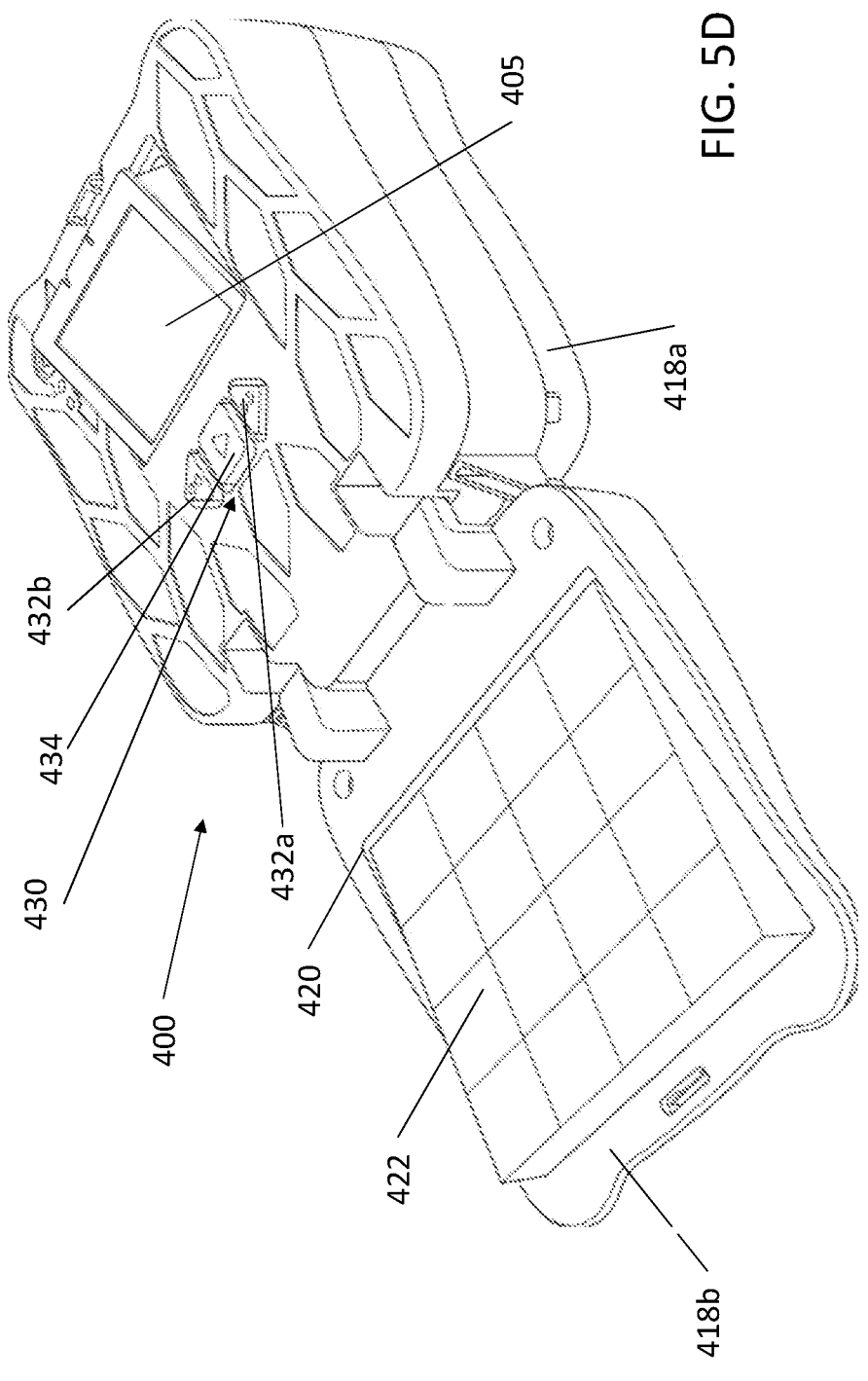

As seen in FIGS. 5C and 5D, the screen 405 may be pivotable between multiple angular positions.

The challenge repository 406 may be any suitable storage element for storing digital data, such as a database, a computer memory, or a buffering memory. The challenge repository 406 may be local to the system 400. For example the challenge repository 406 may be in the form of a data storage element, such as a removable memory card inserted into a dedicated slot 413 in system 400 (illustrated in FIG. 5B) or a database or memory component built into the system 400. In some embodiments, the challenge repository may be remote from system 400. For example, the challenge repository may be a database located remotely from system 400 and communicating therewith via a network.

In some embodiments, the challenge repository 406 is adapted to store, at least temporarily, large amounts of data, in the range of 5 MB to 500 MB. The challenge repository 406 may be particularly useful in buffering data flow between the controller and screen 405, so as to reduce latency. In embodiments in which the challenge repository 406 is local to system 400, it may enable the system 400 to operate even when not in communication with a network or with another remote device. The challenge repository 406 may be volatile or non-volatile memory, such as a flash memory device, retaining the stored data, even when the power is switched off and on, thus accelerating the device start up time.

The power supply may be any suitable power supply, substantially as described hereinabove.

A housing 418 typically houses the screen 405 and the controller. In some embodiments, the housing 418 may also house the power supply and the challenge repository 406.

In some embodiments, the housing 418 comprises a base portion 418a and a cover portion 418b.

In some embodiments, base portion 418a includes screen 405, and houses the controller, the challenge repository, and/or the power source. In some embodiments, base portion 418a also includes a user interface for user interaction, as described in further detail herein. In some embodiments, base portion 418a includes a removable storage drawer 419, which can be opened in a storage accessing orientation of system 400 shown in FIG. 5B, and can be closed in the storage and operational orientations. Drawer 419 may be used to store papers, stickers, and other supplies 422 required for creating a picture based on the image projected on screen 405.

In some embodiments, the cover portion 418b is pivotable relative to the base portion 418a, to transition system 400 between a closed orientation and an operational orientation. In some embodiments, an interior surface of cover portion 418b forms a crafting tray 420, into which can be placed a pad of papers for sketching, or using stickers, based on an image projected on screen 405.

In some embodiments, in the operational orientation of system 400, screen 405 may be pivotable between multiple angular orientations, as seen by comparison of FIGS. 5C and 5D.

A mentioned hereinabove, the controller includes, or remotely communicates with the processor which is operative to execute instructions included in software modules stored in the storage medium. In some embodiments, the storage medium may include a challenge preparation module, which is a software module adapted to prepare a challenge for projection onto screen 405. The challenge typically includes an image and/or a video, and such preparation may include:

changing a format of the image and/or video;

scaling the image and/or video to a size suitable for use on screen 405;

applying at least one filter to the image and/or video; and/or dividing a video into individual sequential frames or images.

The challenge preparation module may also employ image processing algorithms. The prepared challenge image/video may then be transmitted, by the controller, to screen 405 for projection of the image/video.

It is appreciated that in embodiments in which the challenge is audible, or also audible, the challenge preparation module may also be adapted to prepare audio associated with the challenge for being played on an audio speaker element associated with the controller, for example by adjusting the volume, pitch, or voice of the speaker providing the challenge. In some embodiments, the audio speaker element may form part of system 400, for example as part of the projecting device or of screen 405. In other embodiments, the audio speaker element may be separate from system 400.

In some embodiments, system 400 may include a user interface 430, which may for example be disposed on a surface of the base portion 418a of housing 418, for example as illustrated in FIGS. 5B to 5D. The user interface may include any suitable buttons and/or other input or output elements. For example, the user interface may include buttons 432a and 432b adapted for navigating between challenges in the challenge repository or between steps of a multi-step challenge, or a play button 434 for playing a video challenge on screen 405. In some embodiments, the user interface 430 may additionally include visual indicators, such as LED lights, for indicating to the user when the processor is communicating with another device or for providing any other indication to the user. In some embodiments, different colors of illumination or different flashing patterns of light emitted by the visual indicators may indicate different types of communication or actions being carried out by the system.

In some embodiments, for example in embodiments in which voice commands may be provided to the controller, the user interface 430 may further include a microphone (not shown) or other element adapted to capture a voice command from the user. In some embodiments, in which the challenge is audible or has audio associated therewith, the user interface 430 may further include a speaker or other audio providing element (not shown) for providing the audible output to the user.

In some embodiments, system 400 may further include a transceiver, enabling two way communication with a networked environment, for example via a Local Area Network (LAN), a Wide Area Network (WAN), or via the Internet. The two-way communication may be wired communication or wireless communication, and may use any suitable protocol known in the art. In such embodiments, the power supply provides power also to the transceiver.

The transceiver may be particularly useful when the challenge repository 406 is remote from system 400, such that a challenge may be selected from the challenge repository 406 and provided to the controller via the transceiver. In some embodiments, the transceiver may be used to provide to the controller input to be presented to the user, the input received from a remote location via the transceiver. For example, the challenge provided to the user may be electronically defined by a remote guide, such as a teacher or other educational professional, therapist, and the like, and transmitted to the controller of system 400 operated by the user via the transceiver.

In some embodiments, the controller or a portion thereof may be part of, or may be in communication with, an additional computing device, for example via the transceiver, substantially as described hereinabove. In some embodiments, the additional computing device may be a handheld or mobile computing device, such as a suitably equipped mobile telephone or tablet computing device, while in other embodiments the additional computing device may be a computing device in a fixed location, such as a desktop computer. In some such embodiments, an application may be operated on the additional computing device so as to enhance the user's experienced interfacing with the system 400, as well as to reduce load on the controller or processor of system 400 by serving as a low-level tool for off-loading tasks from the controller. Such tasks may include data transportation, temporary or permanent data storage and manipulation, algorithmic calculations, networked tasks, and the like. The additional computing device may function in a slave capacity or in a master capacity. In some embodiments, the additional computing device may be placed in close proximity to system 400, or may lean on housing 418 of system 400 at a specifically allocated position, so as to form a virtual extension of the system 400.

In some embodiments, the application running on the additional computing device may provide a second user interface, allowing the user to select challenges from challenge repository 406 and to move between steps of a challenge. In some such embodiments, the application may be synchronized with the controller, such that any action taken on user interface 430 is reflected in the application, and vice versa.

In some embodiments, built-in components of the additional computing device may be used for providing the challenge to the user or for receiving the user's response to the challenge. For example, in embodiments in which the challenge is (also) audible, the audio of the challenge may be provided to the user via a speaker system built into the additional computing device. As another example, in embodiments in which the challenge response is (also) an audio response, the audio response may be captured by a microphone component of the additional computing device, and transferred therefrom to the controller, for example via the transceiver.

In some embodiments, system 400 may further include an inactivity sensing functionality and/or a thermal sensor substantially as described hereinabove. In some embodiments, a sensor may identify when the cover portion 418b is closed, and ensure that system 400 is off, or in a standby or power preserving mode, during such times.

In use, a desired challenge may be selected from challenge repository 406 by the user, or by another person, substantially as described hereinabove. Following preparation of the challenge, the challenge is presented to the user on screen 405. The user then follows the challenge, to create a duplicate of the challenge on a substrate, such as a paper, using a writing implement or stickers. In some embodiments, the substrate may be disposed within tray 420, as shown in FIGS. 5C and 5D. In some embodiments, the substrate may be divided, or otherwise marked, to assist the user in recreating the challenge on the substrate. In some embodiments, corresponding markings may be shown on screen 405, overlaid over the displayed image, to further assist the user.

In some embodiments, challenges intended for younger children may be simple, and may be completed by placing stickers onto the substrate to match the shape shown on the screen. In some embodiments, challenges intended for older children may be drawing challenges, showing the user a shape to draw, for the user to copy the shape onto the substrate.

In some embodiments, the challenge may be provided to the user in a step-by-step manner, substantially as described hereinabove. This may make it easier for the user to complete the challenge. For example, if the challenge is a challenge of placing square and triangular stickers to form a heart shape, the steps of the challenge may include the location of the stickers one sticker at a time, allowing the child to follow the placement of the stickers. Similarly, if the challenge is a drawing challenge, such as for drawing an airplane, the lines of the airplane may be added in a step-by-step manner, to help the child be able to break-down the task of copying the airplane to segments that can be easily completed.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. patent application Ser. No. 15/060,038 filed Mar. 3, 2016, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A system for providing a drawing challenge comprising a plurality of challenge steps to a user, in a step-by-step manner, the system being associated with at least one challenge repository and a projection surface, the system comprising:

a housing;

a user interface disposed in said housing, said user interface including a plurality of physical buttons, the plurality of physical buttons including a next-step button;

at least one projecting device accommodated within said housing and adapted to project each of said plurality of challenge steps onto the projection surface according to a sequence of said plurality of challenge steps;

a controller accommodated within said housing, said controller including:

a processor functionally associated with the at least one challenge repository and with said at least one projecting device; and a non-transitory computer readable storage medium storing software modules including instructions to be executed by said processor, said non-transitory computer readable storage medium having stored:

instructions to interpret input provided via said user interface;

instructions to receive a selection of said challenge including a said plurality of challenge steps to be projected by said projecting device, wherein said challenge is a drawing challenge or a writing challenge, and each of said plurality of challenge steps includes one or more individual lines and/or curves; and instructions to process said selected challenge in accordance with characteristics of at least one of said projecting device, said projection surface, and ambient conditions, to form, for each challenge step of the challenge, a projectable challenge step for projection by said at least one projecting device;

instructions to provide a first projectable challenge step corresponding to a first of said plurality of challenge steps to said projecting device for projecting thereof; and instructions, to be carried out in response to receipt of a next-step input indicating depression of the next-step button of the user interface, to provide a next projectable challenge step, corresponding to a next step according to said sequence of said plurality of challenge steps, to said projecting device for projecting thereof.

2. The system of claim 1, further comprising a transceiver for enabling communication between said controller and a network, and wherein said at least one challenge repository includes a remote challenge repository remote from said system, and in communication with said controller via said transceiver.

3. The system of claim 1, wherein said at least one challenge repository includes an integral challenge repository forming part of said system and is accommodated within said housing.

4. The system of claim 1, wherein said housing includes a port adapted for receipt of a computer memory including a removable challenge repository, and said at least one challenge repository includes said removable challenge repository associated with said system by insertion of said computer memory into said port.

5. The system of claim 1, wherein said plurality of physical buttons of said user interface further includes a selection button, and wherein said instructions to receive said selection include instructions to receive a selection input indicating depression of said selection button of said user interface.

6. The system of claim 5, wherein at least one of said plurality of physical buttons has a first function when depressed briefly and a second function when depressed for an extended duration, the second function being different from the first function.

7. The system of claim 1, further comprising:

a transceiver disposed within said housing and adapted to communicate with a network; and an additional computing device, adapted to be in communication with said, said additional computing device including an additional user interface for providing instructions to said controller.

8. The system of claim 1, further comprising at least one speaker, wherein said challenge further includes an audio component, and said controller is adapted to provide said audio component to said user via said speaker.

9. The system of claim 1, wherein said instructions to process comprise instructions to process each challenge step to form a said projectable challenge step prior to initiating projection of any of said plurality of challenge steps.

10. The system of claim 1, wherein said instructions to process comprise instructions to process each challenge step during the projection of the previous challenge step.

11. The system of claim 1, wherein the instructions to provide the first projectable challenge step corresponding to a first of said plurality of challenge steps to said projecting device for projecting thereof comprise instructions to wait for receipt of the next-step input before providing another challenge step to the projecting device.

12. A system for providing a challenge to a user, the system comprising:

an image capturing device adapted to capture an image in the real world, wherein the challenge to be completed is based on said image; and a toy system associated with a projection surface, comprising:

a housing;

at least one projecting device, accommodated within said housing and adapted to project said challenge onto the projection surface;

a transceiver enabling communication with said image capturing device;

a controller accommodated within said housing, said controller being functionally associated with said at least one projecting device and with said transceiver, said controller including:

a processor; and a non-transitory computer readable storage medium storing software modules including instructions to be executed by said processor, said non-transitory computer readable storage medium having stored:

instructions to obtain an outline image, based on said image captured by said image capturing device, as said challenge;

instructions to process said challenge in accordance with characteristics of at least one of said projecting device, a projection surface, and ambient conditions, to form a projectable challenge for projection by said at least one projecting device; and instructions to provide said projectable challenge to said projecting device for projecting thereof.

13. The system of claim 12, further comprising an additional computing device including said image capturing device, and wherein said instructions to obtain said outline image comprises instructions to receive said outline image from said additional computing device.

14. The system of claim 12, wherein the instructions to obtain said outline image comprise:

instructions to receive image from said image capturing device; and instructions to convert said image into said outline image.

15. The system of claim 12, wherein:

said instructions to obtain said challenge further include instructions to divide said outline image into a plurality of image subsets, each image subset including one or more individual lines or curves of the outline image, each image subsets forming a challenge step, such that said image challenge is broken into a plurality of challenge steps;

said instructions to process said challenge comprise instructions to process each said image subset in accordance with said characteristics, to form, for each said challenge step, a projectable challenge step for projection by said at least one projecting device;

said instructions to provide said projectable challenge to said projecting device comprise instructions to provide each said projectable challenge step to said projecting device, in a sequential step-by-step manner.

16. The system of claim 15, wherein:

the toy system further includes a user interface disposed in said housing, said user interface including a plurality of physical buttons, the plurality of physical buttons including a next-step button;

said controller further includes instructions to interpret input provided via said user interface; and said instructions to provide each said projectable challenge step comprise:

instructions to automatically provide a first projectable challenge step corresponding to a first of said plurality of challenge steps to said projecting device for projecting thereof; and instructions, to be carried out in response to receipt of a next-step input indicating depression of the next-step button of the user interface, to provide a next projectable challenge step, corresponding to a next step according to said sequence of said plurality of challenge step, to said projecting device for projecting thereof.

17. The system of claim 15, wherein said instructions to process said challenge comprise instructions to process each said image subset to form said projectable challenge step prior to initiating projection of any of said plurality of challenge steps.

18. The system of claim 15, wherein said instructions to process said image challenge comprise instructions to process each said image subset to form said projectable challenge step during the projection of the previous challenge step.

* * * * *